United States Patent [19]
Dixon et al.

[11] Patent Number: 6,045,244
[45] Date of Patent: Apr. 4, 2000

[54] LIGHTING DEVICE FOR VEHICLE WHEELS

[76] Inventors: Jerry Dixon; Carroll Gibson, both of 9700 Maple Rd., Louisville, Ky. 40229

[21] Appl. No.: 09/156,091

[22] Filed: Sep. 17, 1998

[51] Int. Cl.[7] ...................................................... F21V 7/04
[52] U.S. Cl. .......................... 362/500; 362/216; 362/263; 362/549
[58] Field of Search .................................... 362/216, 263, 362/225, 500, 549

[56] References Cited

U.S. PATENT DOCUMENTS

| | | | |
|---|---|---|---|
| 4,430,692 | 2/1984 | Papadakis | 362/32 |
| 5,876,108 | 3/1999 | Chien | 362/500 |

*Primary Examiner*—Sandra O'Shea
*Assistant Examiner*—Anabel Ton

[57] ABSTRACT

A lighting device for vehicle wheels for illuminating the inner portion of a wheel. The lighting device includes a generally translucent annular tube that is filled with neon gas for producing light when an electrical charge is introduced. The tube and extends around an outer perimeter of a brake drum such that the light emitted from the tube is visible through the spokes of the rim of a wheel. A plurality of brackets are coupled to the brake drum towards the outer perimeter of the brake drum. Each of the brackets has first and second flange ends. Each of the brackets is bent to form a generally annular eye between the flange ends of the brackets, through which the tube extends. A power source is electrically connected to the tube.

14 Claims, 2 Drawing Sheets

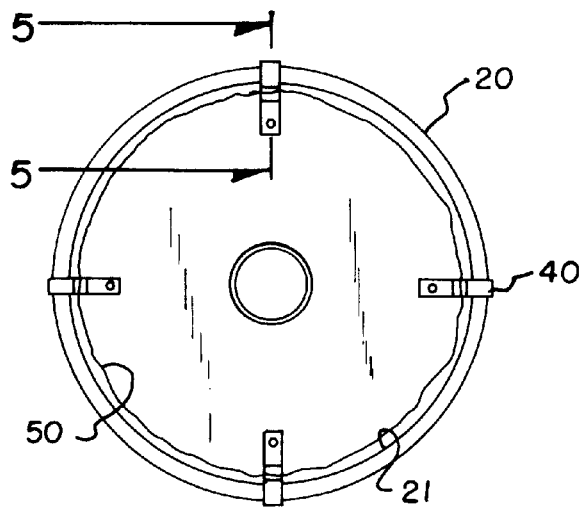
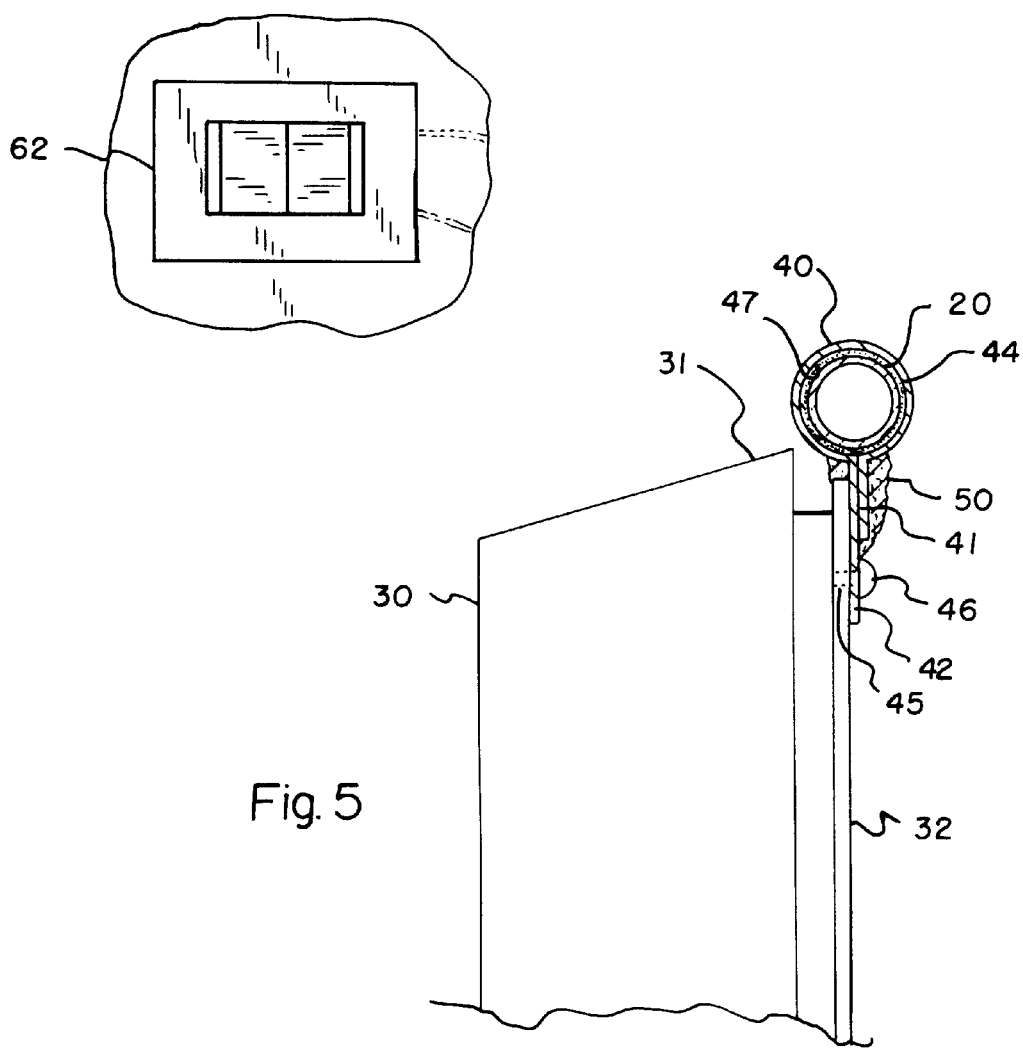

LIGHTING DEVICE FOR VEHICLE WHEELS

BACKGROUND OF THE INVENTION

1. Field of the Invention

The present invention relates to illuminating devices for wheels and more particularly pertains to a new lighting device for vehicle wheels for illuminating the inner portion of a wheel.

2. Description of the Prior Art

The use of illuminating devices for wheels is known in the prior art. More specifically, illuminating devices for wheels heretofore devised and utilized are known to consist basically of familiar, expected and obvious structural configurations, notwithstanding the myriad of designs encompassed by the crowded prior art which have been developed for the fulfillment of countless objectives and requirements.

Known prior art illuminating devices for wheels include U.S. Pat. No. 5,634,707; U.S. Pat. No. 5,558,426; U.S. Pat. No. 2,083,514; U.S. Pat. No. 5,497,302; U.S. Pat. No. Des. 384,024; and U.S. Pat. No. 2,027,478.

While these devices fulfill their respective, particular objectives and requirements, the aforementioned patents do not disclose a new lighting device for vehicle wheels. The inventive device includes a generally translucent annular tube that is filled with neon gas for producing light when an electrical charge is introduced. The tube extends around an outer perimeter of a brake drum. A plurality of brackets are coupled to the brake drum towards the outer perimeter of the brake drum. Each of the brackets has first and second flange ends. Each of the brackets is bent to form a generally annular eye between the flange ends of the brackets, through which the tube extends. A power source is electrically connected to the tube.

In these respects, the lighting device for vehicle wheels according to the present invention substantially departs from the conventional concepts and designs of the prior art, and in so doing provides an apparatus primarily developed for the purpose of illuminating the inner portion of a wheel.

SUMMARY OF THE INVENTION

In view of the foregoing disadvantages inherent in the known types of illuminating devices for wheels now present in the prior art, the present invention provides a new lighting device for vehicle wheels construction wherein the same can be utilized for illuminating the inner portion of a wheel.

The general purpose of the present invention, which will be described subsequently in greater detail, is to provide a new lighting device for vehicle wheels apparatus and method which has many of the advantages of the illuminating devices for wheels mentioned heretofore and many novel features that result in a new lighting device for vehicle wheels which is not anticipated, rendered obvious, suggested, or even implied by any of the prior art illuminating devices for wheels, either alone or in any combination thereof.

To attain this, the present invention generally comprises a generally translucent annular tube that is filled with neon gas for producing light when an electrical charge is introduced. The tube extends around an outer perimeter of a brake drum. A plurality of brackets are coupled to the brake drum towards the outer perimeter of the brake drum. Each of the brackets has first and second flange ends. Each of the brackets is bent to form a generally annular eye between the flange ends of the brackets, through which the tube extends. A power source is electrically connected to the tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lighting device for vehicle wheels apparatus and method which has many of the advantages of the illuminating devices for wheels mentioned heretofore and many novel features that result in a new lighting device for vehicle wheels which is not anticipated, rendered obvious, suggested, or even implied by any of the prior art illuminating devices for wheels, either alone or in any combination thereof.

It is another object of the present invention to provide a new lighting device for vehicle wheels which may be easily and efficiently manufactured and marketed.

It is a further object of the present invention to provide a new lighting device for vehicle wheels which is of a durable and reliable construction.

An even further object of the present invention is to provide a new lighting device for vehicle wheels which is susceptible of a low cost of manufacture with regard to both materials and labor, and which accordingly is then susceptible of low prices of sale to the consuming public, thereby making such lighting device for vehicle wheels economically available to the buying public.

Still yet another object of the present invention is to provide a new lighting device for vehicle wheels which provides in the apparatuses and methods of the prior art some of the advantages thereof, while simultaneously overcoming some of the disadvantages normally associated therewith.

Still another object of the present invention is to provide a new lighting device for vehicle wheels for illuminating the inner portion of a wheel.

Yet another object of the present invention is to provide a new lighting device for vehicle wheels which includes a generally translucent annular tube that is filled with neon gas for producing light when an electrical charge is introduced. The tube extends around an outer perimeter of a brake drum.

A plurality of brackets are coupled to the brake drum towards the outer perimeter of the brake drum. Each of the brackets has first and second flange ends. Each of the brackets is bent to form a generally annular eye between the flange ends of the brackets, through which the tube extends. A power source is electrically connected to the tube.

Still yet another object of the present invention is to provide a new lighting device for vehicle wheels that includes a deformable material that reduces vibration of the neon tube.

Even still another object of the present invention is to provide a new lighting device for vehicle wheels that increases visibility of the vehicle from the side by providing additional illumination.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of the present invention.

FIG. 4 is a schematic side view of the switch of the present invention.

FIG. 5 is a schematic cross-sectional view of the present invention taken from line 5—5 of FIG. 3.

DESCRIPTION OF THE PREFERRED EMBODIMENT

Figure 1:
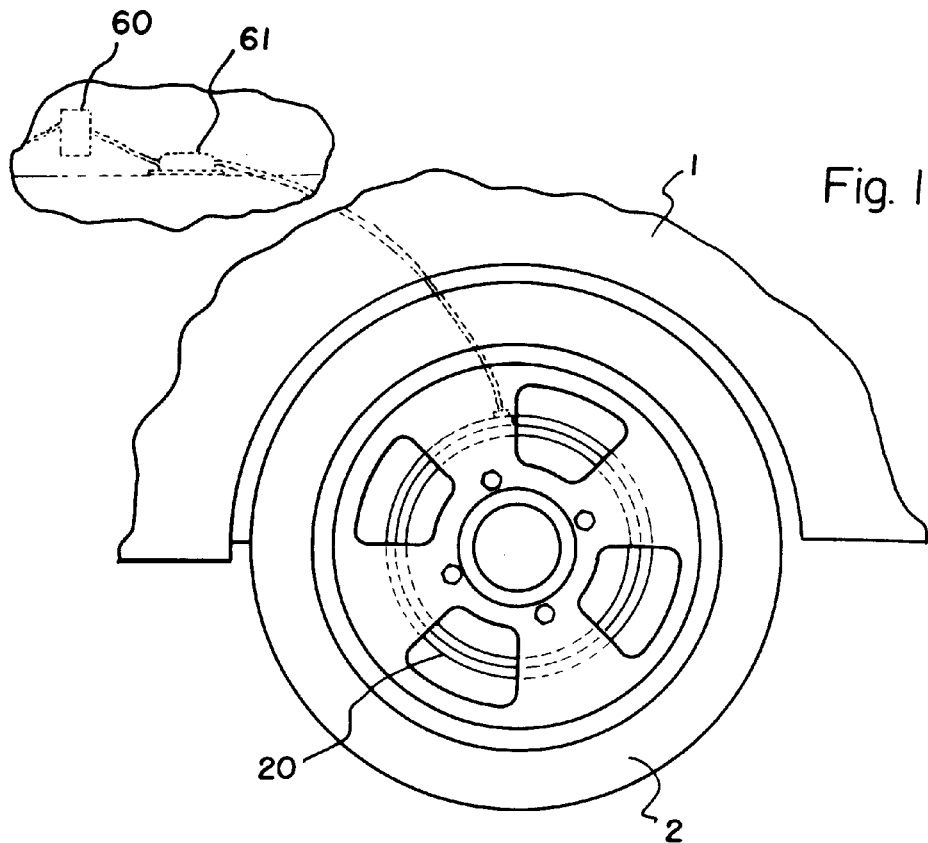
FIG. 1 is a schematic side view of a new lighting device for vehicle wheels according to the present invention.
Figure 2:
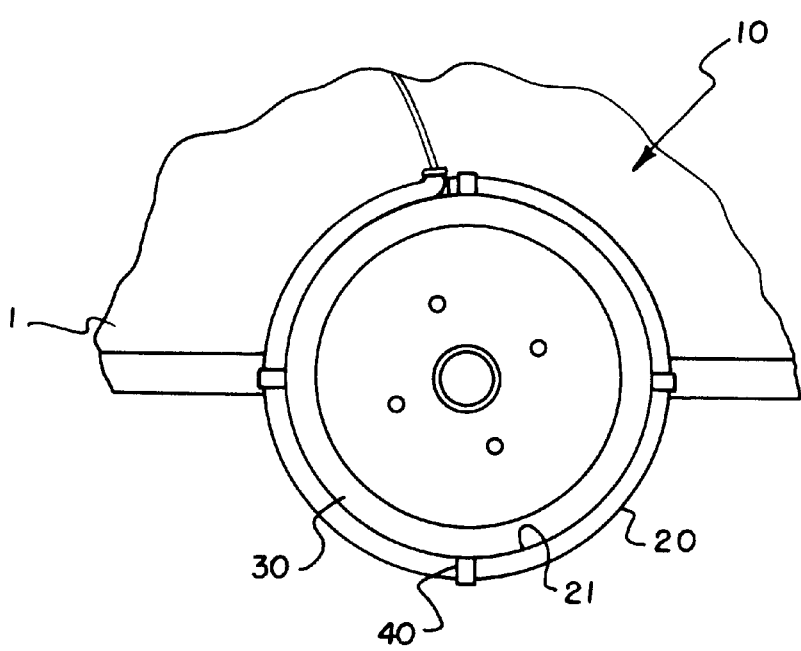
FIG. 2 is a schematic side view of the present invention.

With reference now to the drawings, and in particular to FIGS. 1 through 5 thereof, a new lighting device for vehicle wheels embodying the principles and concepts of the present invention and generally designated by the reference numeral 10 will be described.

As best illustrated in FIGS. 1 through 5, the lighting device for vehicle wheels 10 comprises a generally translucent annular tube 20 that is filled with neon gas for producing light when an electrical charge is introduced. The tube 20 extends around an outer perimeter 31 of a brake drum 30 such that the light emitted from the tube 20 is visible through the spokes of the rim of a wheel 2. A plurality of brackets 40 are coupled to the brake drum 30 towards the outer perimeter 31 of the brake drum 30. Each of the brackets 40 has first and second flange ends 41,42. Each of the brackets 40 is bent to form a generally annular eye between the flange ends 41,42 of the brackets 40, through which the tube 20 extends. A power source 60 is electrically connected to the tube 20.

Preferably, each of the eyes 43 of the brackets 40 has a layer of resiliently deform able material 44, such as foam rubber for example, that extends around an inner surface of the eyes 43. The deformable material 44 cushions the tube 20 and helps prevent vibration of the tube 20 within the eyes 43.

Also preferably, the tube 20 has an inner circumference 21 that defines an inner space. The brake drum 30 extends substantially across the inner space of the tube 20. As illustrated in FIGS. 3 and 5, a deformable cushioning material 50 is positioned between the tube 20 and the outer perimeter 31 of the brake drum 30. The cushioning material 50 helps prevent shock to the tube 20. Ideally, the cushioning material 50 forms a seal between the tube 20 and the outer perimeter 31 of the brake drum 30 to help prevent dirty water from splashing from under the car and onto the visible portion of the tube 20. The preferred material to use as the cushioning material 50 is silicone.

Preferably, each of the brackets 40 is deformable to permit removal of the tube 20 from the eyes 43.

Also preferably, as shown in FIGS. 3 and 5, each of the second flange ends 42 of the brackets 40 has an aperture 45 that extends through it and a threaded fastener 46 that is inserted in the aperture 45. The threaded fastener 46 is threadedly coupled to the brake drum 30 to provide a secure yet removable coupling.

Also preferably, the power source 60 includes a transformer 61 that is electrically connected to the tube 20. A switch 62 is electrically connected to the power source 60 for selectively providing power to the tube 20. Ideally, the switch 62 is disposed in a passenger compartment of the vehicle 1.

Preferably, inner surfaces of each of the eyes 43 of the brackets 40 define a bore 47. Each of the bores 47 has a longitudinal axis (not shown) that extends through it. Each of the flange ends 41,42 of the brackets 40 is substantially flat. The second flange end 42 abuts a flat outer surface 32 of the brake drum 30. The longitudinal axes of the bores 47 of the brackets 40 lie on a plane that extends between the second flange ends 42 of the brackets 40 and the outer surface 32 of the brake drum 30 to help keep the cushioning material 50 between the tube 20 and the brake drum 30. Also, such positioning aids in providing greater stability.

In an exemplary embodiment, a cross section of the tube 20 is circular and has a diameter of greater than about 1/14 inch. The circumference of the tube 20 is about 19 inches.

Preferably, the tube 20 is positioned adjacent a side of the brake drum 30 that is positioned closest the vehicle 1 such that the tube is normally viewed from an opposite side of the rim. Also preferably, the longitudinal axis (not shown) of the tube 20 lies on a plane.

Alternatively, a pair of generally translucent tubes (not shown) may filled with neon gas for producing light when an electrical charge is introduced. Each of the tubes is semi-annular in shape such that positioning the tubes together forms a ring around the outer perimeter 31 of the brake drum 30.

In use, the brackets 40, with the tube 20 extending through the eyes 43 of the brackets 40, are mounted to the brake drum 30 towards the outer perimeter 31 of the brake drum 30. The cushioning material 50 is positioned between the tube 20 and the outer perimeter 31 of the brake drum 30. The switch 62 is activated to provide power to the tube 20, thereby causing the neon gas to emit light. The lighting device 10 may be used with motorcycles and vehicles of many different types.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A lighting device for vehicle wheels having drum brakes, the lighting system comprising:

a generally translucent annular tube being filled with neon gas for producing light when an electrical charge is introduced, said tube being extended around an outer perimeter of a brake drum;

a plurality of brackets being coupled to said brake drum towards said outer perimeter thereof, each of said brackets having first and second flange ends;

said bracket being bent to form a generally annular eye between said flange ends, said tube extending through each of said eyes; and a power source being electrically connected to said tube.

2. The lighting device of claim 1, wherein each of said eyes of said brackets has a layer of resiliently deformable material being extended around an inner surface thereof for cushioning said tube.

3. The lighting device of claim 1, wherein said tube has an inner circumference defining an inner space, said brake drum extending substantially across said inner space.

4. The lighting device of claim 3, further comprising a deformable cushioning material being positioned between said tube and said outer perimeter of said brake drum, said cushioning material being for helping prevent shock to said tube.

5. The lighting device of claim 4, wherein said cushioning material forms a seal between said tube and said outer perimeter of said brake drum.

6. The lighting device of claim 1, wherein each of said brackets is deformable to permit removal of said tube from said eyes.

7. The lighting device of claim 1, wherein each of said second flange ends of said brackets has an aperture extending therethrough and a threaded fastener being inserted in said aperture, said threaded fastener being threadedly coupled to said brake drum.

8. The lighting device of claim 1, wherein said power source has a transformer and a switch being electrically connected to said power source for selectively providing power to said tube, said switch being disposed in a passenger compartment of vehicle.

9. The lighting device of claim 1, wherein inner surfaces of each of said eyes of said brackets define a bore, each of said bores having a longitudinal axis extending therethrough, each of said flange ends of said brackets being substantially flat, said second flange end abutting a flat outer surface of said brake drum, wherein said longitudinal axes of said bores of said brackets lie on a plane extending between said second flange ends of said brackets and said outer surface of said brake drum for helping keep said cushioning material between the tube and said brake drum.

10. The lighting device of claim 1, wherein a cross section of said tube is circular and has a diameter of greater than about ¼ inch.

11. The lighting device of claim 1, wherein the circumference of said tube is about 19 inches.

12. The lighting device of claim 1, wherein said tube is positioned adjacent a side of said brake drum being positioned closest the vehicle.

13. The lighting device of claim 1, wherein a longitudinal axis of said tube lies on a plane.

14. A lighting device for vehicle wheels having drum brakes, the lighting system comprising:

a generally translucent annular tube being filled with neon gas for producing light when an electrical charge is introduced, said tube being extended around an outer perimeter of a brake drum;

said tube having an inner circumference defining an inner space, said brake drum extending substantially across said inner space;

wherein a cross section of said tube is circular and has a diameter of greater than about ¼ inch, wherein a longitudinal axis of said tube lies on a plane;

a plurality of brackets being coupled to said brake drum towards said outer perimeter thereof, each of said brackets having first and second flange ends;

said bracket being bent to form a generally annular eye between said flange ends, said tube extending through each of said eyes, each of said eyes of said brackets having a layer of resiliently deformable material being extended around an inner surface thereof for cushioning said tube;

wherein each of said brackets is deformable to permit removal of said tube from said eyes;

each of said second flange ends of said brackets having an aperture extending therethrough and a threaded fastener being inserted in said aperture, said threaded fastener being threadedly coupled to said brake drum;

wherein the circumference of said tube is about 19 inches;

said tube being positioned adjacent a side of said brake drum being positioned closest the vehicle;

a deformable cushioning material being positioned between said tube and said outer perimeter of said brake drum, said cushioning material being for helping prevent shock to said tube, said cushioning material forming a seal between said tube and said outer perimeter of said brake drum;

each of said inner surfaces of said eyes of said brackets defining a bore, each of said bores having a longitudinal axis extending therethrough;

each of said flange ends of said brackets being substantially flat, said second flange end abutting a flat outer surface of said brake drum, wherein said longitudinal axes of said bores of said brackets lie on a plane extending between said second flange ends of said brackets and said outer surface of said brake drum for helping keep said cushioning material between the tube and said brake drum;

a power source having a transformer being electrically connected to said tube; and a switch being electrically connected to said power source for selectively providing power to said tube, said switch being disposed in a passenger compartment of said vehicle.

* * * * *